United States Patent [19]

Nakakita et al.

[11] 4,433,651
[45] Feb. 28, 1984

[54] HELICAL INTAKE PORT TYPE SUCTION UNIT FOR HORIZONTAL SINGLE-CYLINDER DIRECT INJECTION TYPE DIESEL ENGINE

[75] Inventors: Kiyomi Nakakita; Keiichiro Yamada, both of Sakaishi, Japan

[73] Assignee: Kubota Ltd., Osaka, Japan

[21] Appl. No.: 359,843

[22] Filed: Mar. 19, 1982

[30] Foreign Application Priority Data

Mar. 24, 1981 [JP] Japan ............................ 56-41772[U]

[51] Int. Cl.³ ............................................. F02F 1/42
[52] U.S. Cl. ........................ 123/188 M; 123/195 HC; 123/193 H; 123/306
[58] Field of Search ....... 123/188 M, 193 H, 193 CH, 123/306, 52 M, 52 MV, 301, 195 HC

[56] References Cited

U.S. PATENT DOCUMENTS

| | | | |
|---|---|---|---|
| 742,493 | 10/1903 | Roedel | 123/195 HC |
| 2,927,564 | 3/1960 | Turlay et al. | 123/52 MV |
| 3,769,948 | 11/1973 | Feichtinger et al. | 123/188 M |
| 3,824,971 | 7/1974 | Skatsche et al. | 123/188 M |
| 3,945,363 | 3/1976 | Elsbett et al. | 123/188 M |

FOREIGN PATENT DOCUMENTS

| | | | |
|---|---|---|---|
| 2308327 | 10/1973 | Fed. Rep. of Germany | 123/188 M |
| 144806 | 11/1980 | Fed. Rep. of Germany | 123/188 M |
| 844352 | 8/1960 | United Kingdom | 123/188 M |
| 1207904 | 10/1970 | United Kingdom | 123/188 M |

*Primary Examiner*—Ira S. Lazarus
*Assistant Examiner*—R. S. Bailey
*Attorney, Agent, or Firm*—Schwartz, Jeffery, Schwaab, Mack, Blumenthal & Koch

[57] ABSTRACT

Suction unit for an engine of horizontal single-cylinder direct injection type intended for producing a swirl in a suction air stream by means of a helical intake port, wherein, firstly, the intake port is formed to be "S"-shaped with its mid-section linear and prolonged for increasing the inertia force imparted to the suction air stream without increasing the width of the cylinder head and, secondly, the linear mid-section of the "S"-shaped intake port is formed to continue smoothly into an helical section so that the suction air stream enters unattenuated and guided by the helical passage to swirl up to approx. 180° under acceleration before it enters a combustion chamber and the powerful swirl thus produced is further developed as it advances toward the center of the combustion chamber.

4 Claims, 5 Drawing Figures

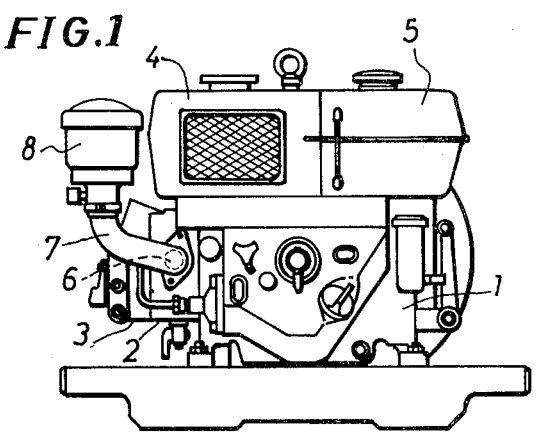
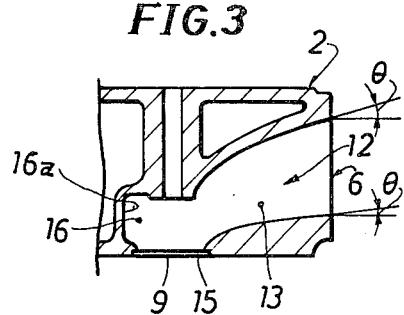
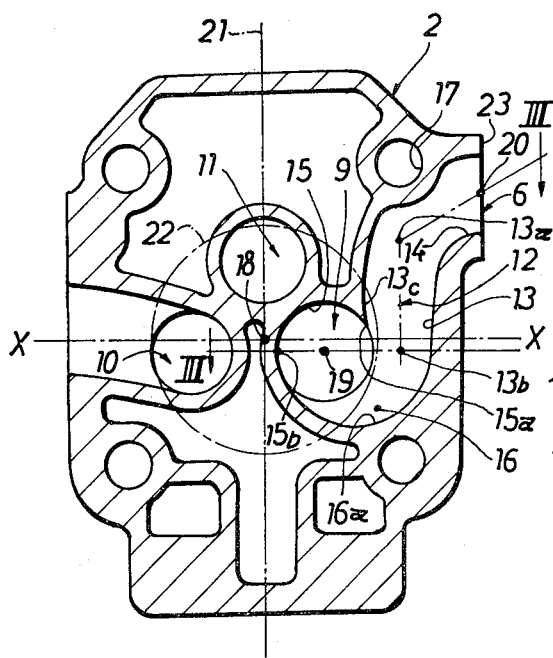
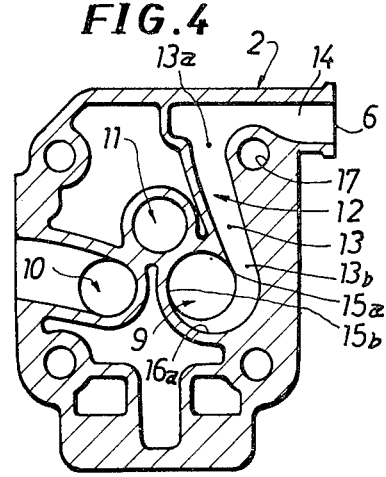
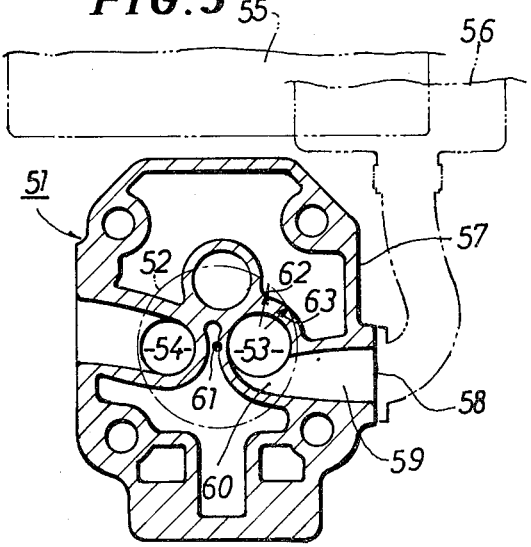

4,433,651

HELICAL INTAKE PORT TYPE SUCTION UNIT FOR HORIZONTAL SINGLE-CYLINDER DIRECT INJECTION TYPE DIESEL ENGINE

BACKGROUND OF THE INVENTION

1. Technical Field of the Invention

The present invention relates to a suction unit having a helical intake port for causing suction air to swirl. The invention is intended for use in a diesel engine of the horizontal single-cylinder direct injection type.

2. Description of the Prior Art

The basic construction of a horizontal single-cylinder direct injection type diesel engine is as described below.

Referring to FIG. 5, an intake valve opening 53 and an exhaust valve opening 54 are arranged side by side in a wall of a cylinder head 51 facing a combustion chamber 52, this arrangement being necessary in view of the location of a valve operating mechanism. A suction air inlet 58 opens in one side wall 57 of the cylinder head 51 on the same side with the intake valve opening 53, this being because of the locations of a radiator 55 and an air cleaner 56, and a helical intake port 59 is provided for connecting the suction air inlet 58 with the intake valve opening 53.

In conventional embodiments of this basic construction the intake port 59 was formed to be substantially horizontal as shown in FIG. 5, and this was known to have the following disadvantages.

A. In case the intake port is of the helical type, the linear section of the intake port 59 is bound to be short and the resultant small inertia force of the suction air cannot be ample for the desired swirling thereof.

B. It is theoretically possible to increase the length of the linear section of the intake port to thereby improve its rectifying performance required for good swirling of the suction air but the engine is then bound to be bulky with its cylinder head 51 wider.

C. Besides the insufficient inertia force of the suction air, a swirl-inducing angle of a helical section 60 of the intake port 59 is small, limited to 90°, hence the swirl produced is bound to be weak. Moreover, this weak swirl is bound to become progressively weaker for the swirling suction air, after having entered the combustion chamber 52, is led in such a direction 62 that it is further off a center 61 of the combustion chamber 52 as it advances, the swirling stream being attenuated through collision against the peripheral wall of the combustion chamber 52.

The consequence was poor air-fuel mixing, causing imperfect combustion, which results in an insufficient output of the engine as well as an increased fuel loss. Worse, imperfect combustion means an increased risk of air pollution because of inferior quality exhaust gas.

D. It is also possible to increase the swirl-inducing angle of the helical section 60 for producing a more powerful swirl. The powerful swirl so produced, however, is bound to get further off the center 61 of the combustion chamber 52 as it advances in the direction 63, the result being an increased attenuation of the swirling stream through collision against the peripheral wall of the combustion chamber 52. This measure is thus known to further weaken the swirl, instead of strengthening it.

SUMMARY OF THE INVENTION

It is an object of the present invention to enhance the inertia force of a suction air stream (linear rectifying effect) immediately before a helical section of an intake port to thereby produce a sufficiently powerful swirl in the helical section without increasing the engine width or bulk.

According to the present invention, therefore, a suction air inlet is located as far away vertically from an intake valve opening as possible and an intake port connecting them is formed "S"-shaped with its mid-section long and substantially linear so as to enhance the inertia force of the suction air stream (linear rectifying effect).

Another object of the present invention is to produce a powerful swirl of suction air and to lead it unattenuated into a cylinder to thereby improve air-fuel mixing to ensure perfect combustion, increase the engine output, reduce the fuel consumption and also make the exhaust gas cleaner in order to reduce the risk of air pollution.

According to the present invention, therefore, the mid-section of the intake port is formed long and substantially linear as aforesaid so as to enhance the inertia force of the suction air stream.

Also, the end portion of the side nearer to the vertical center axis of the cylinder head of the peripheral wall of the intake port in its prolonged, linear mid-section is tangentially connected to the side of the rim of the intake valve opening farther from the vertical center axis of the cylinder head, as viewed from the front side. The powerful stream of suction air past the mid-section of the intake port can then be guided by the other side of the peripheral wall of the intake port in its helical section to start swirling powerfully.

Further, the fore end of the helical section is connected again tangentially to the side of the of the rim of the intake valve opening nearer to the vertical center axis of the cylinder head, as viewed from the front side, so as to make the swirl-inducing angle of the helical section sufficiently large. The stream of suction air having entered the helical section powerfully in a broad arc is thus caused to swirl as it goes through the helical passage of a large swirl-inducing angle and a powerful swirl is produced before it enters the combustion chamber.

Besides increasing the swirl-inducing angle, the center of the intake valve opening can be displayed vertically off the the center of the combustion chamber to the side where the helical section of the intake port is located. The powerful swirl produced in the helical section, after having entered the combustion chamber by the intake valve opening, can thus be caused to advance toward the center of the combustion chamber unattenuated and even gaining in force.

A further object of the present invention is to have the locations, configurations, dimensions etc. of the valve operating mechanism, stud bolts for mounting the cylinder head, radiator etc. in common with a conventional engine, if and as necessary, so that the inventive method can be practised by simply replacing the cylinder head easily at a moderate cost.

BRIEF DESCRIPTION OF THE DRAWINGS

FIG. 1 is a side elvation of a water-cooled horizontal single cylinder direct injection type diesel engine as a preferred embodiment of the present invention.

FIG. 2 is a front elevation in cross-section of a cylinder head according to the present invention.

FIG. 3 is a sectional view taken along the line III—III in FIG. 2.

FIG. 4 is a cross-sectional view corresponding to FIG. 2 of another preferred embodiment of the present invention.

FIG. 5 is a cross-sectional view corresponding to FIG. 2 of a conventional diesel engine.

DETAILED DESCRIPTION OF THE PREFERRED EMBODIMENTS

Described in detail below are preferred embodiments of the present invention under reference to the appended drawings.

FIG. 1 is a side elevational view showing a diesel engine of water-cooled horizontal single-cylinder direct-injection type whose construction is as described below. To the front end of a cylinder monoblock with a crank case 1 a cylinder head 2 and a rocker arm cover 3 are fixedly mounted in this order, while the crank case 1, are fixedly mounted a radiator 4 and a fuel tank 5 arranged one behind the other. An air cleaner 8 is located in front of the cylinder head 2 up to the right and this air cleaner is connected to an inlet 6 of an intake port 12.

FIG. 2 is a front elevation in cross-section of the cylinder head 2, while FIG. 3 is a sectional view taken along the line III—III in FIG. 2.

Referring now to FIG. 2, in a wall of a cylinder head 2 facing a combustion chamber 22 there open side by side an intake valve opening 9 on the right and an exhaust valve opening 10 on the left and above between these two openings 9, 10 there is provided another opening 11 for receiving a mouth-piece of a fuel injector (not shown). In the righthand side wall 23 of the cylinder head 2 opens a suction air inlet 6 and between this suction air inlet 6 and the intake valve opening 9 there is formed a connecting intake port 12 of helical type.

The center 19 of the intake valve opening 9 is disposed slightly below the center 18 of the combustion chamber 22 and the center 20 of the suction air inlet 6 is disposed far above said center 18. The intake port 12 is formed to be "S"-shaped.

The mid-section 13 of the intake port 12 runs vertically, being substantially linear and prolonged.

The end portion 15a of the side nearer to the vertical axis 21 of the cylinder head 2 of the peripheral wall of the intake port 12 in its prolonged, linar mid-section 13 is tangentially connected to the side of the rim 15 of the intake valve opening 9 farther from the vertical center axis 21 of the cylinder head 2 as viewed from the front side of the engine.

The helical section 16 of the intake port 12 is formed to be progressively closer to the intake valve opening 9 toward the fore end thereof. The fore end 15b of this helical section 16 is connected again tangentially to the side of the rim 15 of the intake valve opening 9 nearer to the vertical center axis 21 of the cylinder head 2 as viewed from the front side so as to make the swirl-including angle of the helical section as large as approx. 180°.

The cylinder head 2 has two, left and right, vertical pairs of mounting bolt holes 17 running through it longitudinally. The portion of the intake port 12 from its beginning end 14 to the mid-section 13 runs on the side of the upper right bolt hole 17 nearer to the suction air inlet 6. In the figure shown as 13a is the beginning end of the mid-section 13 of the intake port 12 and 13b is the last end thereof. The line x—x represents the horizontal plane containing the center 18 of the combustion chamber 22.

Now described is how the above arrangement works.

The suction air taken in by the inlet 6 is led down the intake port 12. The stream of suction air is rectified as it flows through the prolonged, linear mid-section 13 of the intake port 12 and is further imparted with a strong inertia force whereby the suction air charing rate of the combustion chamber 22 is increased with resultant improvement of the volume efficiency and the engine output is thus improved.

This suction air stream with its high inertia force is oriented at the fore end 15a of the peripheral wall of the mid-section 13 of the intake port 12 so that the powerful stream is guided by the outside portion of the peripheral wall 16a of the helical section 16 of a swirl-inducing angle of approx. 180° to swirl powerfully under simultaneous acceleration, and a powerful swirl is thus produced.

The powerful swirl thus produced, after having entered the combustion chamber 22 by the intake valve opening 9, advances toward the center 18 of the combustion chamber 22 unattenuated and even gaining in force.

The air-fuel mixing is improved thereby for perfect combustion to be ensured. As a result, the engine output is improved and the fuel consumption reduced for a sizable saving of the running cost and, further, the exhaust gas is made cleaner and reduced is the risk of air pollution.

With this intake port arrangement generally good results are obtained when the inclination of the intake port 12 in the vicinity of the inlet 6 against the horizontal is made relatively small as shown in FIG. 3, namely $\theta_1 = 0 \sim 20°$ and $\theta_2 = 0 \sim 10°$.

In the above case, the result of a steady flow swirl test showed that the cylinder swirl ratio, for instance, was 2.13 or approximately 3 times as high as with a conventional counterpart. Moveover, the suction index (average Mach number in the intake port) was as low as 0.58 and thus formation of a powerful and good swirl could be confirmed.

In this case, the layout of the stud bolts, valves, push rods etc. is perfectly identical with a conventional counterpart, hence the engine's combustion efficiency can be improved as well as its output by simply replacing a conventional cylinder head with one according to the present invention.

Shown in FIG. 4 is another preferred embodiment of the present invention wherein the embodiment described above is partly modified as follows.

In this embodiment the suction air inlet 6 is located higher than the upper right mounting bolt hole 17. Also, the intake port 12 has its section from the beginning end 14 to the mid-section 13 disposed above said upper right mounting bolt hole 17 and also extending toward the vertical center axis 21 of the cylinder head 2 beyond said bolt hole 17, and its mid-section 13 running downward slightly off to the right.

In this embodiment which has the linear mid-section 13 of the intake port 12 further prolonged further increased is the inertia force of the suction air stream. The steady flow swirl test showed a favorable result of 2.14 in cylinder swirl ratio.

The suction index in this case was 0.59 and a sufficiently high volume efficiency could thus be confirmed.

What is claimed is:

1. A helical intake port type suction unit for a horizontal direct injection type diesel engine having a single cylindrical combustion chamber with a center, said unit comprising:
- a cylinder head having a vertical center axis and comprising a substantially vertical inner wall facing said combustion chamber, an outer wall facing opposite to said inner wall, and at least one substantially vertical side wall;
- an intake valve opening and an exhaust valve opening disposed side by side in said inner wall, said intake valve opening having a peripheral rim, and a center spaced vertically, in a first vertical direction, from said combustion chamber center;
- a suction air opening disposed in said side wall, said suction air opening having a center spaced vertically, in second vertical direction opposite to said first vertical direction, from said combustion chamber center;
- a generally S shaped helical intake port connecting said suction air opening to said intake valve opening, said intake port including an elongated substantially linear mid section, said mid section extending generally vertically in said cylinder head, said mid section being positioned laterally of said center axis and being defined by an inner wall and an outer wall, said inner wall being closer to said center axis than said outer wall, said inner wall having an end tangentially connected to said rim, and said outer wall being connected to a curving wall which forms a fore helical section of said intake port, said curving wall being formed progressively closer to said rim and connecting tangentially to said rim, the tangential connection of said curving wall being closer to said center axis than the tangential connection of said inner wall.

2. A helical intake port type suction unit as set forth in claim 1, wherein said center of said intake valve opening is disposed below said center of said combustion chamber and said center of said suction air inlet is disposed far above said center of said combustion chamber.

3. A helical intake port type suction unit as set forth in claim 1, including one upper mounting hole and one lower mounting hole formed in said cylinder head on each of the right and left sides of said center axis, and wherein said intake port includes a beginning section extending from said suction air opening to said mid section, said beginning section being formed in close proximity to one of said mounting holes, said cylinder head having a horizontal center axis and said close mounting hole having a side closer to said horizontal center axis and a side farther than said horizontal center axis, said beginning section being formed to curve around said side closer to said horizontal center axis.

4. A helical intake port type suction unit as set forth in claim 1, including one upper and one lower mounting hole formed in said cylinder head on each of the right and the left sides of said center axis, and wherein said intake port includes a beginning section extending from said suction air opening to said mid section, said beginning section being formed in close proximity to one of said mounting holes, said cylinder head having a horizontal center axis and said close mounting hole having a side closer to said horizontal center axis and a side farther from said horizontal center axis, said beginning section being formed along said side farther from said horizontal center axis and extending toward said vertical center axis to a position past the position of said close mounting hole.

* * * * *